(12) United States Patent
Kurihara et al.

(10) Patent No.: US 9,543,065 B2
(45) Date of Patent: Jan. 10, 2017

(54) NONCONTACT ELECTRIC POWER TRANSMISSION EQUIPMENT

(71) Applicant: Panasonic Intellectual Property Management Co., Ltd., Osaka (JP)

(72) Inventors: Hiroaki Kurihara, Shiga (JP); Atsushi Fujita, Shiga (JP); Hideki Sadakata, Shiga (JP); Yoshiharu Omori, Shiga (JP); Daisuke Bessyo, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/813,036

(22) Filed: Jul. 29, 2015

(65) Prior Publication Data

US 2015/0332826 A1   Nov. 19, 2015

Related U.S. Application Data

(63) Continuation of application No. PCT/JP2014/000414, filed on Jan. 28, 2014.

(30) Foreign Application Priority Data

Jan. 30, 2013   (JP) .................................. 2013-015077

(51) Int. Cl.
*H01F 27/29*   (2006.01)
*H01F 5/00*   (2006.01)
(Continued)

(52) U.S. Cl.
CPC ............... *H01F 5/00* (2013.01); *B60L 11/182* (2013.01); *H01F 5/02* (2013.01); *H01F 27/29* (2013.01);
(Continued)

(58) Field of Classification Search
CPC ....................... H01F 5/00; H01F 27/00–27/30
(Continued)

(56) References Cited

U.S. PATENT DOCUMENTS

| 3,840,795 A | 10/1974 | Roszyk et al. |
| RE28,499 E * | 7/1975 | Flentge .................. H01F 27/02 336/107 |

(Continued)

FOREIGN PATENT DOCUMENTS

| JP | 08-126120 A | 5/1996 |
| JP | 2002-319514 A | 10/2002 |

(Continued)

OTHER PUBLICATIONS

International Search Report issued in corresponding International Patent Application No. PCT/JP2014/000414 on Apr. 8, 2014; 3 pages with partial English translation.

(Continued)

*Primary Examiner* — Tuyen Nguyen
(74) *Attorney, Agent, or Firm* — McDermott Will & Emery LLP

(57) ABSTRACT

Disclosed is a noncontact power transmission system including a power transmission device for transmitting power to a power receiving device in a noncontact manner. The power transmission device includes a cover covering a portion of an outline of the power transmission device where the power transmission device faces the power receiving device, a base covering another portion of the outline of the power transmission device where the power transmission device does not face the power receiving device, a magnetic body arranged in a space enclosed with the cover and the base, a coil bobbin covering the magnetic body partially or entirely, and a coil wire which is wound around the coil bobbin and which generates a magnetic flux upon receiving an alternating current. The coil bobbin includes a load support.

1 Claim, 5 Drawing Sheets

(51) Int. Cl.
*B60L 11/18* (2006.01)
*H01F 27/30* (2006.01)
*H01F 38/14* (2006.01)
*H02J 5/00* (2016.01)
*H01F 5/02* (2006.01)
*H02J 7/00* (2006.01)
*B60M 7/00* (2006.01)

(52) U.S. Cl.
CPC .............. *H01F 27/30* (2013.01); *H01F 38/14* (2013.01); *H02J 5/005* (2013.01); *H02J 7/0042* (2013.01); *B60M 7/003* (2013.01)

(58) Field of Classification Search
USPC ....... 336/65, 90, 92, 96, 196, 198, 192, 200, 336/220–223, 232
See application file for complete search history.

(56) References Cited

U.S. PATENT DOCUMENTS

| | | | |
|---|---|---|---|
| 4,800,328 A | 1/1989 | Bolger et al. | |
| 6,853,284 B2* | 2/2005 | Nagai | H01F 27/325 336/183 |
| 6,958,673 B2* | 10/2005 | Suzuki | H01F 27/022 336/198 |
| 7,579,936 B2* | 8/2009 | Hsu | H01F 5/02 336/178 |
| 8,106,738 B2* | 1/2012 | Sin | H01F 3/14 336/196 |
| 2002/0093410 A1* | 7/2002 | Nakayama | H01F 38/08 336/182 |
| 2013/0181667 A1 | 7/2013 | Takeshita et al. | |
| 2014/0055089 A1 | 2/2014 | Ichikawa et al. | |

FOREIGN PATENT DOCUMENTS

| | | |
|---|---|---|
| JP | 2002319514 A * | 10/2002 |
| JP | 2005-101392 A | 4/2005 |
| JP | 2012-089618 A | 5/2012 |
| WO | 2012-039077 A1 | 3/2012 |
| WO | 2012/157114 A1 | 11/2012 |

OTHER PUBLICATIONS

Extended European Search Report issued in corresponding European Patent Application No. 14746386.3, mailed on Mar. 8, 2016.

* cited by examiner

NONCONTACT ELECTRIC POWER TRANSMISSION EQUIPMENT

CROSS-REFERENCE TO RELATED APPLICATIONS

This is a continuation of International Application No. PCT/JP2014/000414 filed on Jan. 28, 2014, which claims priority to Japanese Patent Application No. 2013-015077 filed on Jan. 30, 2013. The entire disclosures of these applications are incorporated by reference herein.

BACKGROUND

The present disclosure relates to a noncontact power transmission system suitable for noncontact power transmission.

FIG. 9 is a schematic presentation illustrating the configuration of a conventional noncontact power transmission system. In FIG. 9, a power transmission device 2 connected to a power source for power transmission is disposed on the ground, and a power receiving device 4 is mounted on an electric propulsion vehicle 3. The power transmission device 2 has a housing including a cover 5 covering a portion of the power transmission device 2 facing the power receiving device 4, and a base 6 covering a portion of the power transmission device 2 not facing the power receiving device 4. A primary coil 7 is provided in the housing of the power transmission device 2. The power receiving device 4 is provided with a secondary coil 8 for receiving power. In transmitting the power, an alternating current is applied to the primary coil 7 provided in the power transmission device 2 to produce a magnetic flux. The magnetic flux allows the secondary coil 8 of the power receiving device 4 to generate induced electromotive force. Thus, the power is transmitted from the primary coil 7 to the secondary coil 8 in a noncontact manner.

FIG. 10 is a cross-sectional view of the power transmission device of FIG. 9. In FIG. 10, the primary coil 7 is comprised of a plurality of magnetic bodies 12, coil bobbins 13 each covering an associated one of the magnetic bodies 12 partially or entirely, and coil wires 14 wound around the associated one of the coil bobbins 13.

The power receiving device 4 is connected, for example, to an onboard battery (not shown), which is charged by the power transmitted in the above-described manner. The power stored in the onboard battery drives an onboard motor (not shown). During the noncontact power transmission process, the power transmission device 2 and the power receiving device 4 exchange required information through wireless communications device (not shown), for example.

SUMMARY

The power transmission device 2 is expected to be loaded downward. For example, in a phase before transmitting the power, the electric propulsion vehicle 3 approaches to make the power transmission device 2 and the power receiving device 4 face each other. During this approach, however, the electric propulsion vehicle 3 may possibly run onto the power transmission device 2 to apply a heavy load onto the housing of the power transmission device 2. In particular, the cover 5 is positioned to face the power transmission device 2 (disposed on the surface of the housing), and tends to receive a direct load. Even if the power transmission device 2 is attached to a wall surface such that the electric propulsion vehicle 3 does not run over the power transmission device 2, the electric propulsion vehicle 3 may still come into contact with the power transmission device 2 sideward to apply a heavy load thereto. This may possibly do damage on the housing of the power transmission device 2, such as the cover 5 and the base 6, to which the heavy load is applied. Even if the housing is not damaged, the cover 5 or base 6 that has been deformed may come into contact with a part such as the primary coil 7 disposed in the housing, and may do damage on the part eventually. Therefore, the power transmission device 2 is required to have strength that is high enough to allow the device to withstand such heavy load, and to prevent the device from being deformed or damaged easily.

However, a high strength metal may not be used for the cover 5, because the primary coil 7 needs to generate the magnetic flux to transmit the power to the secondary coil 8. To increase the structural strength, a supporting structure may be provided particularly in a center portion inside the housing. However, the primary coil 7 occupies the entire inner space of the housing, and there is no space left for providing such a structure. If such a supporting structure were provided near the center portion of the housing, the supporting structure should be put on the primary coil 7. In such a case, just like the case where the housing is deformed to come into contact with the primary coil 7 disposed in the housing, some force would be applied to the primary coil 7 even under only a little strain. This would increase the risk of doing damage on the primary coil 7.

It is therefore an object of the present disclosure to provide a noncontact power transmission system with high safety by increasing the strength of the power transmission device so much as to withstand such downward treading load.

To overcome the problem described above, the present disclosure provides the following. According to an aspect of the present disclosure, provided is a noncontact power transmission system including a power transmission device for transmitting power to a power receiving device in a noncontact manner. The power transmission device includes a cover covering a portion of an outline of the power transmission device where the power transmission device faces the power receiving device, a base covering another portion of the outline of the power transmission device where the power transmission device does not face the power receiving device, a magnetic body arranged in a space enclosed with the cover and the base, a coil bobbin covering the magnetic body partially or entirely, and a coil wire which is wound around the coil bobbin and which generates a magnetic flux upon receiving an alternating current, wherein the coil bobbin includes a load support.

According to this configuration, the load support supports a portion surrounding the center of the cover, thereby increasing the strength of the cover. The load support supporting the cover receives a force from the cover. However, the load support does not apply the force to the coil wire, but transmits the force to the base, thereby supporting the load without doing damage to the coil wire.

In one particular embodiment, the load support according to the aspect described above is disposed on an outer surface of the coil bobbin, extends from inside of turns of the coil wire to pass between the turns of the coil wire, and has a height protruding from an outer periphery of the turns of the coil wire.

According to this configuration, even when the cover is deformed by the load applied thereto, the deformed cover is prevented from coming into contact with the coil wire, and applying the force to the coil wire.

In another particular embodiment, the load support according to the aspect described above is disposed on an inner surface of the coil bobbin to connect an upper portion and a lower portion of the inner surface of the coil bobbin.

The magnetic body also has lower strength, and tends to be damaged more easily, than the material of the cover. If the magnetic body is damaged, the cover is no longer supported by the magnetic body, and thus the cover may also be damaged, or may be deformed so significantly as to apply the force to the coil wire. The provision of the load support inside the coil bobbin, however, prevents the force transmitted from the cover from being applied to the magnetic body, thereby avoiding the damage.

According to the present disclosure, a portion of the coil bobbin is configured as a load support to support a portion around the center of the cover, thereby increasing the strength of the cover. In this configuration, the load support supports the cover, and thus receives the force from the cover. However, the load support does not apply the force to the coil wire, but transmits the force to the base directly. This thus allows for supporting the load without doing damage on the coil wire.

DETAILED DESCRIPTION

An embodiment of the present disclosure will be described below with reference to the drawings. Note that the present disclosure is not limited to this embodiment.
(Embodiment)

Figure 1:
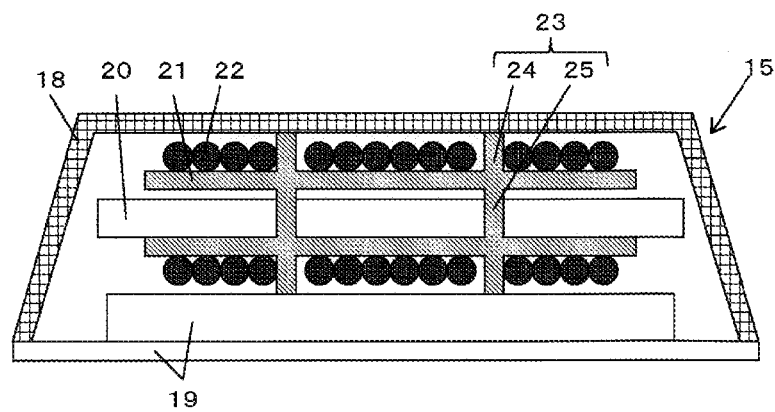
FIG. 1 is a vertical cross-sectional view of a power transmission device of a noncontact power transmission system according to an embodiment.
Figure 9:
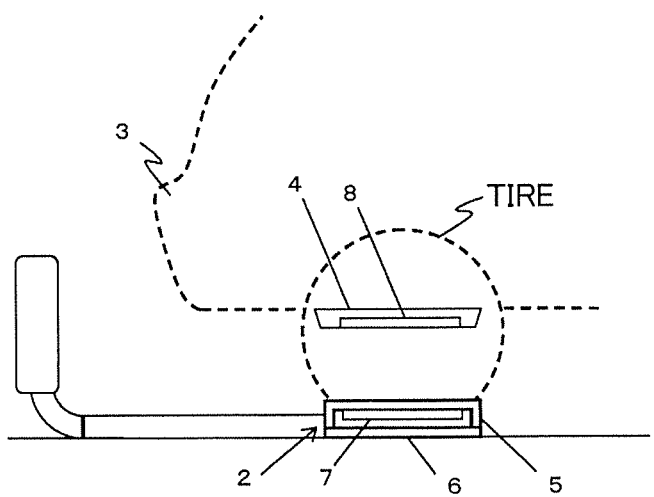
FIG. 9 is a schematic representation illustrating a configuration of a conventional noncontact power transmission system.
Figure 10:
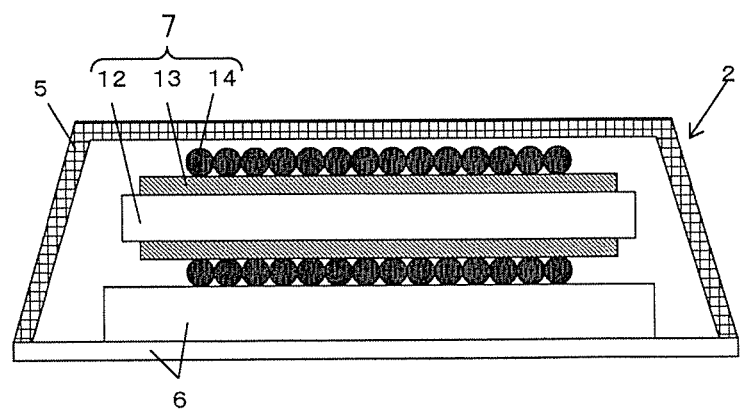
FIG. 10 is a vertical cross-sectional view of a power transmission device of the conventional noncontact power transmission system.

FIG. 1 is a vertical cross-sectional view of a power transmission device of a noncontact power transmission system according to an embodiment. The disclosed noncontact power transmission system includes a power transmission device 15 which generates a magnetic field, and a power receiving device (not shown) receives power from the generated magnetic field to achieve noncontact power transmission from the power transmission device 15 to the power receiving device. Here, the power receiving device is mounted on an electric propulsion vehicle 16 shown in FIG. 4, and may be, in particular, the power receiving device 4 mounted on the electric propulsion vehicle 3 shown in FIG. 9.

Figure 4:
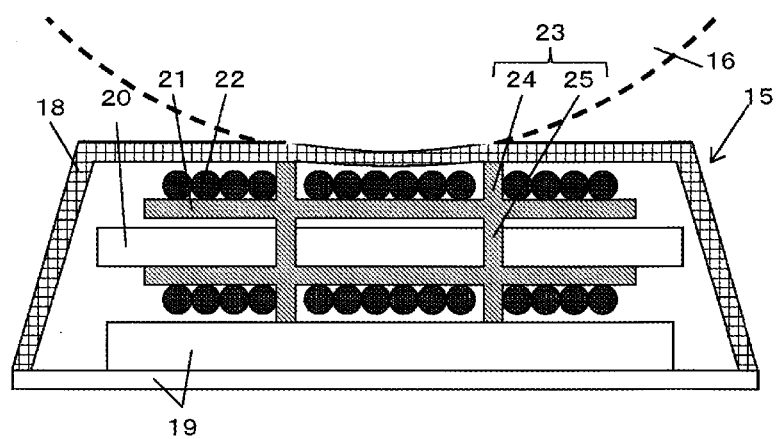
FIG. 4 is a vertical cross-sectional view of the power transmission device which is run over by an electric propulsion vehicle.

The power transmission device 15 is disposed on the ground, and the power receiving device is disposed in the electric propulsion vehicle 16 (see FIG. 4). In transmitting the power, the electric propulsion vehicle 16 is moved to a position where the power receiving device and the power transmission device 15 face each other.

The housing of the power transmission device 15 includes a cover 18 covering a portion of the power transmission device facing the power receiving device, and a base 19 covering another portion of the power transmission device not facing the power receiving device. The cover 18 is made of a nonmetallic material such as a resin, FRP, concrete, or any other suitable material so as not to be heated by the magnetic field generated for the power transmission.

The power transmission device 15 covered with the cover 18 and the base 19 contains a magnetic body 20, a coil bobbin 21 covering at least part of the magnetic body 20, and a coil wire 22 wound around an outer surface of the coil bobbin 21. An alternating current is input to the coil wire 22 to generate a magnetic flux.

The coil bobbin 21 includes a load support 23. The load support 23 includes a first load support 24 and a second load support 25.

The first load support 24 passes through the gap between the turns of the coil wire 22 and extends from the surface of the coil bobbin 21 on which the coil wire 22 is wound toward the cover 18 (or the base 19) until it protrudes from the turns of the coil wire 22. Note that the first load support 24 of the present embodiment has its ends in contact with the cover 18 and the base 19, respectively.

The second load support 25 is disposed inside the coil bobbin 21 and is shaped to connect an upper portion and a lower portion of an inner surface of the coil bobbin 21.

Figure 2:
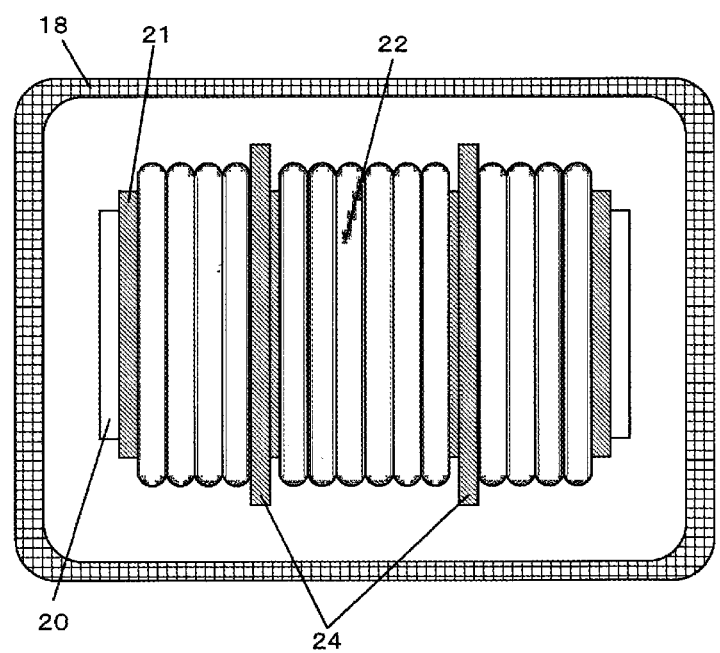
FIG. 2 is a horizontal cross-sectional view of the power transmission device of the noncontact power transmission system according to the embodiment.

FIG. 2 is a horizontal plan view of the power transmission device 15. In FIG. 2, the first load support 24 is provided between the turns of the coil wire 22 wound around the coil bobbin 21, and has its ends protruding from the coil wire 22 (in the horizontal direction) in the same manner as its ends protruding in the vertical direction as shown in FIG. 1. In FIG. 2, the first load support 24 is configured to be continuous without having any notches, but may have at least one notch (not shown) for connecting the turns of the coil wire 22 on the right and left of the first load support 24.

Figure 3:
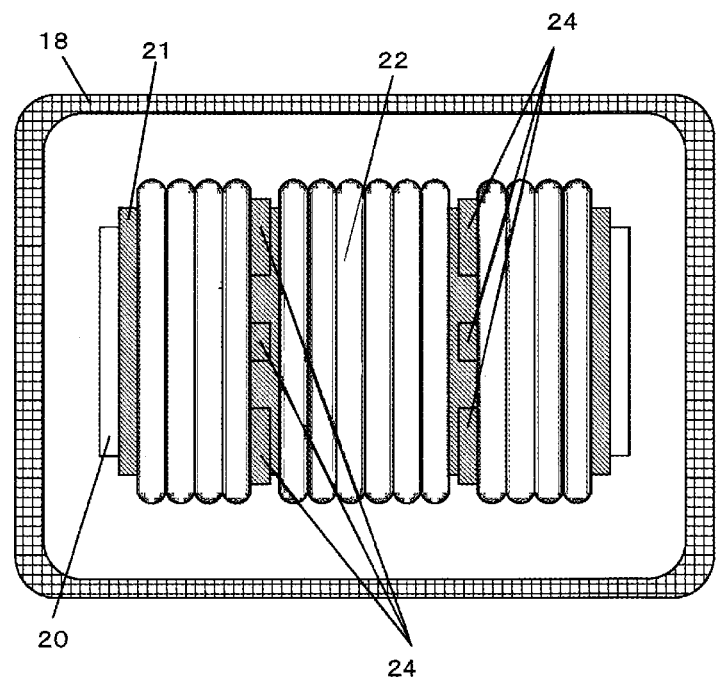
FIG. 3 is a horizontal cross-sectional view of the power transmission device of the noncontact power transmission system according to the embodiment.

Alternatively, as shown in FIG. 3, the first load support 24 may be divided into several portions, or may not protrude from the coil wire 22 (in the horizontal direction).

The electric propulsion vehicle 16 makes the power receiving device attempt to receive the transmitted power via the magnetic field generated by the power transmission device 15. To perform the power transmission, the power receiving device and the power transmission device 15 need to be positioned to face each other. Thus, the electric propulsion vehicle 16 is operated such that the vehicle is aligned with the power transmission device 15 by moving its entire vehicle body. However, the electric propulsion vehicle 16 may possibly run onto the power transmission device 15 due to some erroneous operation.

FIG. 4 is a vertical cross-sectional view of the power transmission device which is run over by the electric propulsion vehicle. In this case, the load of the electric propulsion vehicle 16 is applied to the cover 18, which would usually cause the cover 18 to be deformed. The cover 18 is generally made of a nonmetallic material, and therefore, is low in strength and is easily deformed.

In the present embodiment, however, the first load support 24 (extending upward) is arranged to be in contact with the cover 18 and supports the cover 18, and thus allowing for reducing the deformation.

Specifically, the load applied to the first load support 24 (extending upward) is transmitted to the base 19 through the second load support 25 and the first load support 24 (extending downward). The base 19 covers the portion of the power transmission device 15 not facing the power receiving device, and therefore, is made of a high strength metallic material or any other suitable material. Thus, the base 19 can withstand the transmitted load of the electric propulsion vehicle 16. Since the base 19 is disposed on the ground, the force applied to the base 19 is transferred to the ground. Further, with the first load support 24 configured to have a height protruding from the turns of the coil wire 22, the cover 18 and the coil wire 22 are not brought into contact with each other even if the cover 18 is deformed to some extent, and therefore, the coil wire 22 is not loaded directly.

Thus, when the present embodiment is adopted, the load is not applied to the coil wire 22 and the magnetic body 20 which tend to be damaged easily by the load, thereby avoiding doing damage to them.

When the electric propulsion vehicle 16 runs onto the power transmission device 15, the vehicle does not always run onto a portion of the power transmission device immediately above the first load support 24, but may possibly run onto a portion thereof where the first load support 24 is not provided. Since the portion supported by the first load support 24 is hardly deformed, a portion of the cover 18 which sags is reduced in length. Thus, the magnitude of deformation of the cover 18 is reduced as compared with the case where the load support 23 is not provided.

When the electric propulsion vehicle 16 gets off the power transmission device 15, the force that has been applied to the cover 18 is no longer present, and the cover 18 returns to the original state.

(First Alternative)

Figure 5:
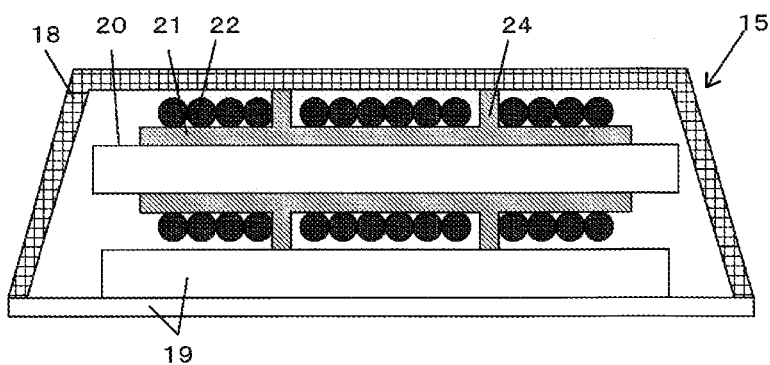
FIG. 5 is a vertical cross-sectional view of a power transmission device of a noncontact power transmission system according to a first alternative.

FIG. 5 is a vertical cross-sectional view of a power transmission device of a noncontact power transmission system according to a first alternative. In this alternative, the load support 23 shown in FIG. 1 is comprised of only the first load support 24. In this configuration, the first load support 24 receives the load applied to the cover 18 first, and disperses the load applied downward from the first load support 24. Then, the load is applied to the magnetic body 20. Since the magnetic body 20 has higher strength than the coil wire 22 in general, the magnetic body 20 can be prevented from being damaged as long as the load is dispersed. Further, the space that is occupied in the embodiment described above by the second load support 25 is filled with the magnetic body 20, thereby improving the efficiency of the power transmission by the power transmission device 15 as compared with the embodiment.

(Second Alternative)

Figure 6:
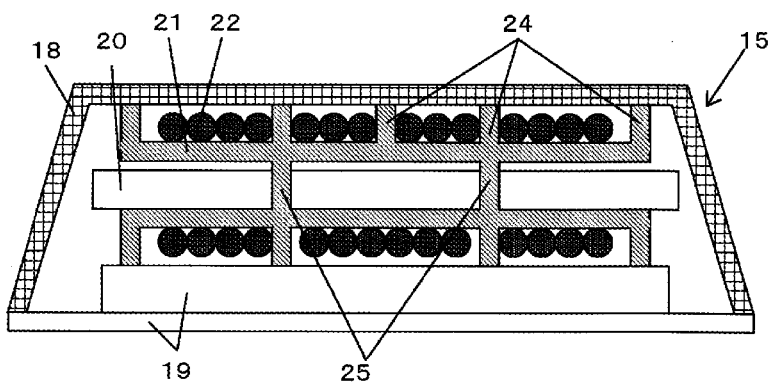
FIG. 6 is a vertical cross-sectional view of a power transmission device of a noncontact power transmission system according to a second alternative.

FIG. 6 is a vertical cross-sectional view of a power transmission device of a noncontact power transmission system according to a second alternative. In this alternative, the load support 23 shown in FIG. 1 is provided with additional first load supports 24. This configuration allows for further reduction of the sagging of the cover 18.

In the alternative shown in FIG. 6, the number of the first load supports 24 is increased. However, instead of increasing the number, the positions of the first load supports 24 may be changed. By changing the numbers and/or the positions of the first load supports 24 and the second load supports 25, each of the first load supports 24 may be arranged at a suitable position depending on where the coil wire 22 is to be wound, and the shape of the second load support 25 may be changed according to the shape of the magnetic body 20.

(Third Alternative)

Figure 7:
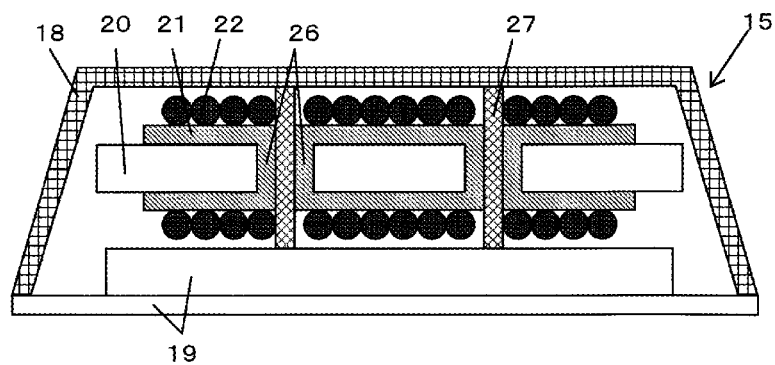
FIG. 7 is a vertical cross-sectional view of a power transmission device of a noncontact power transmission system according to a third alternative.

FIG. 7 is a vertical cross-sectional view of a power transmission device of a noncontact power transmission system according to a third alternative. In this alternative, in place of the load support 23 shown in FIG. 1, a load support mount 26 is provided on the coil bobbin 21, and is combined with a load support attachment 27 provided separately from the coil bobbin 21 to constitute the load support 23.

Also in this alternative, the load support attachment 27 is configured to have a height protruding from the turns of the coil wire 22. Thus, the cover 18 and the coil wire 22 do not come into contact with each other even if the cover 18 is deformed to some extent, and therefore, the coil 22 is not loaded directly.

(Fourth Alternative)

Figure 8:
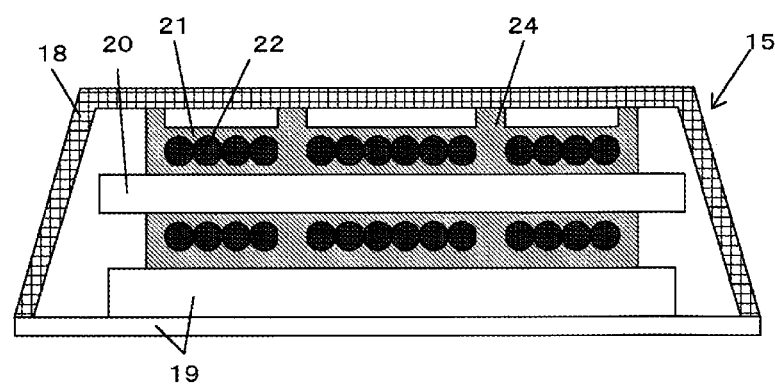
FIG. 8 is a vertical cross-sectional view of a power transmission device of a noncontact power transmission system according to a fourth alternative.

FIG. 8 is a vertical cross-sectional view of a power transmission device of a noncontact power transmission system according to a fourth alternative. In this alternative, the coil bobbin 21 is embodied as a molded product, which is integrated with the magnetic body 20 and the coil wire 22. Also in this case, the advantages similar to those offered by the other alternatives can be obtained.

In the present embodiment and its alternatives, the load support 23 is configured to be in permanent contact with the cover 18 and the base 19. However, the load support 23 may be configured such that a gap is left between the load support 23 and the cover 18 when no load is applied onto the cover 18 (when the cover 18 is not deformed), and that the gap disappears and the cover is supported by the load support 23 when the cover 18 is deformed.

As can be seen from the foregoing, according to the present disclosure, the coil wire and the magnetic body disposed in the power transmission device are not damaged even when a load is applied to the power transmission device. Thus, for example, the present disclosure is useful for a device which may receive a heavy load, and in which coils and other parts that are sensitive to the load occupy so much of the space inside the device that it is difficult to provide a structure for supporting the load in the inner space.

What is claimed is:

1. A noncontact power transmission system including a power transmission device for transmitting power to a power receiving device in a noncontact manner, the power transmission device comprising:
   a cover covering a portion of an outline of the power transmission device where the power transmission device faces the power receiving device;
   a base covering another portion of the outline of the power transmission device where the power transmission device does not face the power receiving device;
   a magnetic body arranged in a space enclosed with the cover and the base;
   a coil bobbin covering the magnetic body partially or entirely; and
   a coil wire which is wound around the coil bobbin and which generates a magnetic flux upon receiving an alternating current, wherein the coil bobbin includes a load support, and the load support is disposed on an outer surface of the coil bobbin, extends from inside of turns of the coil wire to pass between the turns of the coil wire, and has a height protruding from an outer periphery of the turns of the coil wire.

* * * * *